(12) United States Patent
Nishida

(10) Patent No.: US 10,147,247 B2
(45) Date of Patent: Dec. 4, 2018

(54) ON-VEHICLE EMERGENCY NOTIFICATION DEVICE

(71) Applicant: TOYOTA JIDOSHA KABUSHIKI KAISHA, Toyota-shi, Aichi-ken (JP)

(72) Inventor: Junichi Nishida, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/318,522

(22) PCT Filed: Jun. 23, 2015

(86) PCT No.: PCT/IB2015/001142
§ 371 (c)(1),
(2) Date: Dec. 13, 2016

(87) PCT Pub. No.: WO2015/198134
PCT Pub. Date: Dec. 30, 2015

(65) Prior Publication Data
US 2017/0124788 A1    May 4, 2017

(30) Foreign Application Priority Data

Jun. 23, 2014 (JP) .................. 2014-128299

(51) Int. Cl.
*B60Q 1/00* (2006.01)
*G07C 5/08* (2006.01)
(Continued)

(52) U.S. Cl.
CPC ....... *G07C 5/0866* (2013.01); *G06K 9/00805* (2013.01); *G07C 5/008* (2013.01);
(Continued)

(58) Field of Classification Search
CPC .... G07C 5/008; G07C 5/0866; G07C 5/0833; B60R 2021/0027; B60R 21/0136;
(Continued)

(56) References Cited

U.S. PATENT DOCUMENTS 6,141,611 A * 10/2000 Mackey ................. G07C 5/008
340/438
6,947,181 B1 * 9/2005 Sato .................... H04N 1/00204
358/1.15
(Continued)

FOREIGN PATENT DOCUMENTS

JP    H07-304473 A    11/1995
JP    2001-086277 A    3/2001
(Continued)

*Primary Examiner* — Joseph Feild
*Assistant Examiner* — Rufus Point
(74) *Attorney, Agent, or Firm* — Oliff PLC

(57) ABSTRACT

An on-vehicle emergency notification device that performs notification processing when an emergency event of a vehicle occurs, using a power accumulated in a battery mounted on the vehicle, includes: a voice communication unit that performs voice communication with a notification center via a voice call when the emergency event occurs; and an image sending unit that wirelessly sends images around the vehicle to the notification center when the emergency event occurs. After the emergency event occurs, a wireless sending of images by the image sending unit is inhibited if a battery power level of the battery becomes lower than a predetermined value.

9 Claims, 8 Drawing Sheets

(51) Int. Cl.
*G08G 1/00* (2006.01)
*G07C 5/00* (2006.01)
*G06K 9/00* (2006.01)
*H04N 7/18* (2006.01)

(52) U.S. Cl.
CPC ........... *G07C 5/0833* (2013.01); *G08G 1/205* (2013.01); *H04N 7/183* (2013.01)

(58) Field of Classification Search
CPC . B60R 21/013; B60R 2300/105; B60R 11/04; B60R 2021/01013; G06K 9/00805; H04W 4/22; H04W 76/007; H04W 52/283; A61B 5/6893; A61B 5/7282
See application file for complete search history.

(56) References Cited

U.S. PATENT DOCUMENTS

| | | | | |
|---|---|---|---|---|
| 7,092,802 | B2* | 8/2006 | Baldassa | B60R 25/00 348/552 |
| 7,274,924 | B2* | 9/2007 | Yoshioka | G08B 25/016 455/345 |
| 7,724,128 | B2* | 5/2010 | Shimizu | G08G 1/205 340/425.5 |
| 9,047,321 | B2* | 6/2015 | Chan | G06F 17/3028 |
| 9,315,151 | B2* | 4/2016 | Taylor | B60R 1/00 |
| 9,656,608 | B2* | 5/2017 | McMahon | H04N 7/181 |
| 2003/0025793 | A1* | 2/2003 | McMahon | H04N 7/181 348/148 |
| 2003/0028298 | A1* | 2/2003 | Macky | G07C 5/008 701/33.4 |
| 2003/0053536 | A1* | 3/2003 | Ebrami | G08B 13/19634 375/240.01 |
| 2003/0212567 | A1* | 11/2003 | Shintani | G06Q 99/00 725/105 |
| 2004/0041538 | A1* | 3/2004 | Sklovsky | H04W 52/0264 320/127 |
| 2005/0283438 | A1* | 12/2005 | Brownewell | G07C 5/008 705/50 |
| 2007/0001512 | A1 | 1/2007 | Sato et al. | |
| 2007/0159309 | A1* | 7/2007 | Ito | G16H 10/20 340/425.5 |
| 2008/0228349 | A1* | 9/2008 | Nakamura | B60R 21/01538 701/33.4 |
| 2012/0039537 | A1* | 2/2012 | Keys | H04N 1/00183 382/182 |
| 2013/0106594 | A1 | 5/2013 | Hiramatsu et al. | |
| 2013/0145482 | A1* | 6/2013 | Ricci | H04W 4/90 726/28 |
| 2013/0314503 | A1* | 11/2013 | Nix | G06K 9/00805 348/46 |
| 2014/0289225 | A1* | 9/2014 | Chan | G06F 17/3028 707/722 |
| 2014/0293042 | A1* | 10/2014 | Lynam | B60R 1/00 348/118 |
| 2015/0042959 | A1* | 2/2015 | Leary | G03B 21/10 353/13 |
| 2016/0144816 | A1* | 5/2016 | Koya | G08B 25/10 340/436 |

FOREIGN PATENT DOCUMENTS

| | | |
|---|---|---|
| JP | 2001-236586 A | 8/2001 |
| JP | 2007-013497 A | 1/2007 |
| JP | 2007-076404 A | 3/2007 |
| JP | 2012-014728 A | 1/2012 |
| JP | 2013-109752 A | 6/2013 |

* cited by examiner

F I G . 2
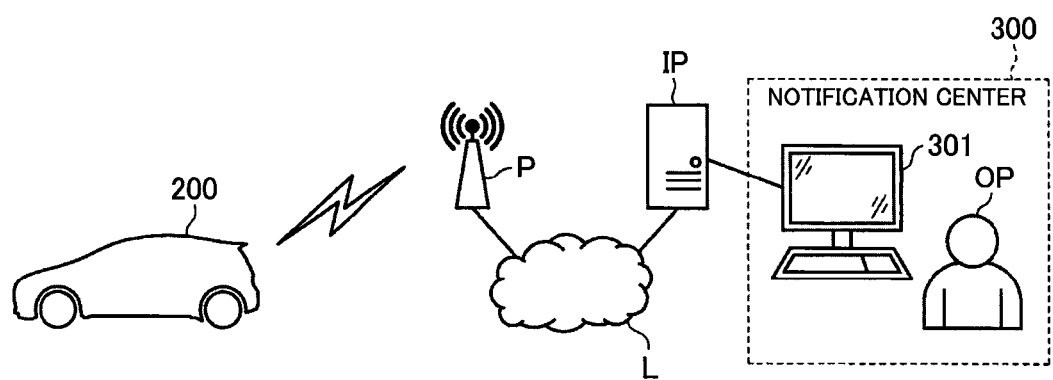

ON-VEHICLE EMERGENCY NOTIFICATION DEVICE

BACKGROUND OF THE INVENTION

1. Field of the Invention

The present invention relates to an on-vehicle emergency notification device that notifies about the occurrence of an emergency event, such as a vehicle accident or collision, from a vehicle to a notification center.

2. Description of Related Art

A device is proposed that captures and records the images around a vehicle during traveling, such as the device described in Japanese Patent Application Publication No. 7-304473 (JP 7-304473 A), for use in analyzing the cause of a vehicle accident or collision. After an accident, this device selectively records the image data, generated in the direction of the impact force at a collision time, to reduce the required memory capacity. In addition, this device monitors the state of the battery mounted on a vehicle and, when the battery power is sufficient, converts recording data into the compressed form for recording on a recording medium. On the other hand, when the power is not sufficient for converting data to the compressed form, this device records data, to which a high priority is given in advance, in the uncompressed, usual form. The on-vehicle emergency notification device described above sends data, recorded and held in this manner, to the notification center.

In addition to the image data described above, there are several pieces of important information, such as a voice call, that the on-vehicle emergency notification device must notify at the time of an emergency event such as a vehicle accident or collision. Therefore, depending upon the state of the battery mounted on the vehicle, there is a possibility that neither the situation can be explained nor can the information be exchanged via a voice call.

SUMMARY OF THE INVENTION

The present invention provides an on-vehicle emergency notification device that can send a notification at emergency event occurrence time using an appropriate notification unit according to the power level of the battery mounted on a vehicle.

A first aspect of the present invention relates to an on-vehicle emergency notification device. The on-vehicle emergency notification device is an on-vehicle emergency notification device that performs notification processing when an emergency event of a vehicle occurs, using a power accumulated in a battery mounted on the vehicle. The on-vehicle emergency notification device includes a voice communication unit that performs voice communication with a notification center via a voice call when the emergency event occurs; and an image sending unit that wirelessly sends images around the vehicle to the notification center when the emergency event occurs. After the emergency event occurs, a wireless sending of images by the image sending unit is inhibited if a battery power level of the battery becomes lower than a predetermined value.

According to the aspect described above, if the battery power level of the battery becomes lower than the predetermined value after the occurrence of an emergency event of the vehicle, such as an accident or a collision, is detected based on the output result of the sensors, such as the acceleration sensor, mounted on the vehicle, the wireless sending of images to the notification center, which is performed by the image sensing unit, is inhibited. Therefore, the inhibition of this wireless sending reserves the power supply (battery power level) necessary for voice communication with the notification center via a voice call that becomes more important when such an emergency event occurs, making it possible to report the occurrence state of the event and to exchange the necessary information. On the other hand, if the battery power level of the battery is equal to or higher than the predetermined value after the occurrence of the above emergency event is detected, the image sending unit is allowed to wirelessly send images to the notification center. These images, though not so urgent as the voice communication described above, are information important for verifying the state of the accident or the collision. In this way, the configuration described above allows a notification to be sent at an emergency event occurrence time using a notification unit better suited for the battery power level at that time. It is desirable that the predetermined value described above for the battery power level be a value almost equal to the battery capacity required for performing communication with the notification center via a voice call for a predetermined length time.

According to the on-vehicle emergency notification device described above, when the emergency event occurs, the image sending unit may give priority to images around the vehicle according to content of the emergency event and preferentially send highly prioritized images wirelessly.

According to the above configuration, because priority is given to the images according to the content of the emergency event that occurred, the images that are likely to identify the state of the event more in detail are preferentially sent wirelessly. Therefore, the occurrence state of the emergency event can be notified to the notification center quickly and accurately.

According to the on-vehicle emergency notification device described above, the image sending unit may give a high priority to images captured a predetermined time before a time when the emergency event occurred. According to the above configuration, the images captured a predetermined time before the occurrence of the emergency event in the vehicle, more in detail, the images captured immediately before the occurrence of the event, are preferentially sent to the notification center wirelessly. Therefore, the information useful for verifying the cause of the occurrence of the emergency event is preferentially notified to the notification center.

According to the on-vehicle emergency notification device described above, the image sending unit may give a high priority to images captured a predetermined distance before a position where the emergency event occurred. According to the above configuration, the images captured a predetermined distance before the occurrence position of the emergency event of the vehicle, more in detail, the images captured immediately before the occurrence of the event, are preferentially sent to the notification center wirelessly. Therefore, in this case too, the information useful for verifying the cause of the occurrence of the emergency event is preferentially notified to the notification center.

According to the on-vehicle emergency notification device described above, the image sending unit may give a high priority to images captured in a direction of an impact force when the emergency event occurred. According to the above configuration, the images that include an object to which an impact force is applied by the collision, that is, the images that are a minimum requirement for verifying the cause of the emergency event occurrence, are preferentially sent to the notification center wirelessly. Therefore, the state of the occurrence of the emergency event can be notified to the notification center while reducing the amount of information (images) that is sent to the notification center.

According to the on-vehicle emergency notification device described above, the battery power level of the battery may be determined each time an image is wirelessly sent via the image sending unit. According to the above configuration, even if the amount of power, required for wirelessly sending all images to be sent, is larger than the amount of power corresponding to the battery power level of the battery, the images are wirelessly sent to the notification center as long as the battery power level of the battery is equal to or larger than the predetermined value. Therefore, the images can be sent wirelessly to the notification center as long as possible while ensuring the battery power level of the battery required for voice communication with the notification center via a voice call.

According to the on-vehicle emergency notification device described above, the battery power level of the battery may be determined by a remaining amount of battery power calculated by subtracting an amount of power required for sending the images to be wirelessly sent from an amount of power accumulated in the battery.

According to the above configuration, based on the result of estimation whether the battery power level after wirelessly sending all images to be sent is smaller than a predetermined value, it is determined whether those images are to be sent wirelessly to the notification center. This allows the battery power level of the battery, required for voice communication with the notification center via a voice call, to be reserved more stably.

According to the on-vehicle emergency notification device described above, occurrence detection sensitivity to the emergency event may be increased when a pedestrian is detected as an images around the vehicle. As described above, it is possible to determine whether the emergency event has occurred, for example, based on the output result of the acceleration sensor that is mounted on the vehicle. It is also possible to set the detection sensitivity changeable depending upon the monitoring level at which the output result is determined. In this point, according to the above configuration, if a pedestrian is detected in the images around the vehicle, that is, if there is a high possibility that a pedestrian is included in the causes of the emergency event, the occurrence state can be notified to the notification center accurately by making the occurrence of the emergency event more sensitive.

According to the on-vehicle emergency notification device described above, the battery may be a backup battery that is an emergency battery and the backup battery may be a secondary battery. According to the above configuration, even if the backup battery is already consumed to a certain degree before the occurrence of the emergency event, the consumed power of the battery can be recovered by recharging before the occurrence of the emergency event. In addition, a secondary battery, if used for the backup battery, can reduce the required battery capacity as compared to a primary battery because a secondary battery can be recharged. This realizes a compact design of the backup battery, leading to a reduction in the installation space of the backup battery in the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a schematic diagram showing an example of a system configuration in which the on-vehicle emergency notification device in the embodiment sends a notification to a notification center;

DETAILED DESCRIPTION OF EMBODIMENTS (First Embodiment)

Figure 1:
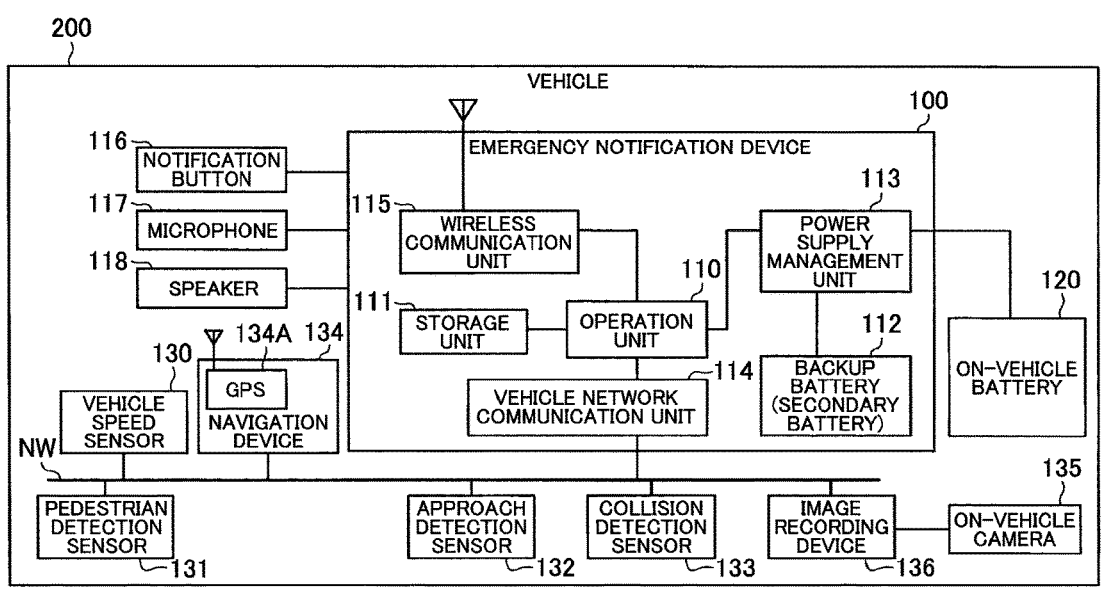
FIG. 1 is a block diagram showing a general configuration of an on-vehicle emergency notification device in a first embodiment.

A first embodiment of an on-vehicle emergency notification device in a first embodiment is described below with reference to the drawings. As shown in FIG. 1, an emergency notification device 100 in this embodiment, mounted on a vehicle 200, is a device that notifies a notification center about the occurrence of an emergency event such as an accident or a collision of the vehicle 200. This emergency notification device 100, capable of wirelessly sending and receiving various types of information to and from the notification center, automatically and wirelessly sends the images around the vehicle, which indicate the collision occurrence state of the vehicle 200, to the notification center. The emergency notification device 100 also reports the collision occurrence state of the vehicle 200, and exchanges necessary information with an operator at the notification center, via a voice call. The emergency notification device 100 is connected to various types of on-vehicle devices and the sensors for controlling the on-vehicle devices via a vehicle network NW such as the Controller Area Network (CAN). The surrounding conditions of the vehicle 200 can be obtained based on the output result of these sensors. Although directly connected to the vehicle network NW for the sake of description in FIG. 1, the sensors are connected, in practice, to the vehicle network NW via the on-vehicle ECUs that control the operation of the various on-vehicle devices of the vehicle 200.

The emergency notification device 100 gives priority to an image, which is wirelessly sent from the vehicle 200, according to the content of the emergency event. The emergency notification device 100 includes an operation unit 110 that integrally performs various types of operation processing for giving this priority. When performing the notification processing, the operation unit 110 reads various types of information, such as the vehicle ID that is the individual identification information on the vehicle 200, from a storage unit 111 or writes various parameters, which are updated based on the information obtained from the sensors via the vehicle network NW, into the storage unit 111.

The emergency notification device 100 includes a power supply management unit 113 that manages the power supply between an on-vehicle battery 120 and a backup battery 112. When the on-vehicle battery 120 is used as the power supply of the emergency notification device 100, the power supply management unit 113 monitors the voltage value that is output from the on-vehicle battery 120 and outputs the signal, which indicates the monitored voltage value, to the operation unit 110. When the voltage value that is output from the on-vehicle battery 120 becomes lower than the threshold, for example, when the on-vehicle battery 120 is damaged at a collision time of the vehicle 200, the power supply management unit 113 switches the power supply of the emergency notification device 100 from the on-vehicle battery 120 to the backup battery 112. After the power supply of the emergency notification device 100 is switched, the power supply management unit 113 monitors the voltage value that is output from the backup battery 112 and, at the same time, outputs the signal, which indicates the monitored voltage value, to the operation unit 110.

In this embodiment, the on-vehicle battery 120 functions as a main battery of the vehicle 200 that supplies the power to various on-vehicle devices including the emergency notification device 100. On the other hand, the backup battery 112 functions as an emergency battery for reserving the power necessary for the notification processing from the vehicle. In this embodiment, a secondary battery that is chargeable during a travel of the vehicle 200 is used for the backup battery 112. The backup battery 112 works as a spare battery of the on-vehicle battery 120 and supplies the power not only to the emergency notification device 100 but also to various on-vehicle devices.

The emergency notification device 100 includes a vehicle network communication unit 114 connected to the sensors described above via the vehicle network NW. In this case, the sensors include the following sensors: a sensor that detects the traveling state of the vehicle such as a vehicle speed sensor 130 that detects the vehicle speed of the vehicle 200, a pedestrian detection sensor 131 that detects whether there is a pedestrian around the vehicle, an approach detection sensor 132 that detects the approach of an object around the vehicle, and a collision detection sensor 133 that detects a collision of the vehicle 200. The pedestrian detection sensor 131, for example, an infrared camera that captures the images around the vehicle, performs the image recognition processing for the captured images to detect whether there is a pedestrian around the vehicle and outputs the signal, which indicates the detection result, to the vehicle network communication unit 114. The approach detection sensor 132, for example, a millimeter wave radar that measures the distance to an object around the vehicle, detects whether the distance to an object around the vehicle becomes smaller than the threshold and outputs the signal, which indicates the detection result, to the vehicle network communication unit 114. The collision detection sensor 133, for example, an acceleration sensor that detects the impact applied to the vehicle 200 based on the acceleration of the vehicle 200, detects the collision of the vehicle 200 when the deceleration of the vehicle 200 becomes equal to or higher than the threshold and outputs the signal, which indicates the detection result, to the vehicle network communication unit 114.

The vehicle network communication unit 114 is connected also to a navigation device 134, which performs route guidance for the vehicle 200, via the vehicle network NW. The navigation device 134 has a Global Positioning System (GPS) 134A mounted for detecting the traveling position of the vehicle 200. The GPS 134A receives the GPS satellite signal for detecting the absolute position of the vehicle 200 on which the GPS 134A is mounted. The GPS 134A identifies the position of the vehicle based on the received GPS satellite signal. The navigation device 134 performs route guidance for the vehicle 200 based on the latitude/longitude information that indicates the position identified by the GPS 134A. The GPS 134A outputs the latitude/longitude information, which indicates the identified position, also to the vehicle network communication unit 114 via the vehicle network NW.

The vehicle network communication unit 114 is connected also to an image recording device 136, which records the images around the vehicle captured by on-vehicle cameras 135, via the vehicle network NW. More in detail, the image recording device 136 records the images captured by the on-vehicle cameras 135 such as a front camera that monitors the area in front of the vehicle 200, side cameras that monitor the area to the sides of the vehicle 200, and a back camera that monitors the area in the back of the vehicle 200. The image recording device 136 accumulates a plurality of images captured by the on-vehicle cameras 135 at a predetermined time interval during the travel of the vehicle 200. When the data capacity of the accumulated images exceeds the recording capacity of the image recording device 136, the image recording device 136 automatically deletes the images in the reverse chronological order of imaging dates/times for updating the images with new images.

The emergency notification device 100 includes a wireless communication unit 115 that wirelessly sends and receives various types of information to and from the notification center. The wireless communication unit 115 receives a start command signal from the operation unit 110. This start command signal indicates the start of the notification processing upon detecting the collision of the vehicle 200 (with this detection as a trigger) through the collision detection sensor 133. After the start command signal is received from the operation unit 110, the wireless communication unit 115 wirelessly sends the image information, which is read by the operation unit 110 from the image recording device 136 via the vehicle network NW, to the notification center. In this case, because the operation unit 110 reads the images, accumulated in the image recording device 136, in the descending priority order, the wireless communication unit 115 wirelessly sends the images in the descending priority order. On the other hand, when an occupant of the vehicle 200 that has caused a collision presses a notification button 116, the emergency notification device 100 wirelessly sends voice communication information, entered by the occupant of the vehicle 200 through a microphone 117, to the notification center via the wireless communication unit 115. When a voice communication response to the vehicle 200 is received, the wireless communication unit 115 outputs the voice communication information to the occupant of the vehicle 200 via a speaker 118. In this manner, a voice-call voice communication is performed between the occupant of the vehicle 200 and an operator at the notification center.

FIG. 2 shows an example of the configuration of an emergency notification system in which a notification is sent from the vehicle 200 to a notification center 300. As shown in FIG. 2, when a voice call for notifying about the state of a collision is sent from an occupant of the vehicle 200 that has caused collision, the voice communication information via the voice call is wirelessly sent in this emergency notification system from the vehicle 200 to a base station P over the mobile phone network. In addition, because the situation around the vehicle at a collision time is captured in advance by the on-vehicle cameras 135, the captured image information is also sent wirelessly from the vehicle 200 to the base station P via the mobile phone network. The information, wirelessly sent to the base station P, is transmitted from the base station P to the notification center 300 via the Internet line L and an Internet service provider IP. The information transmitted to the notification center 300 is output to an operator OP as a voice or an image via an information terminal 301 provided at the notification center 300.

When a voice call for confirming the detail of the collision state is sent from the operator OP of the notification center 300 to the occupant of the vehicle via the information terminal 301, the voice communication information via the voice call is wirelessly sent to the vehicle 200 through the similar path. After that, the voice communication information, wirelessly sent to the vehicle 200, is output from the wireless communication unit 115 to the occupant of the vehicle 200 via the speaker 118.

Figure 3A:
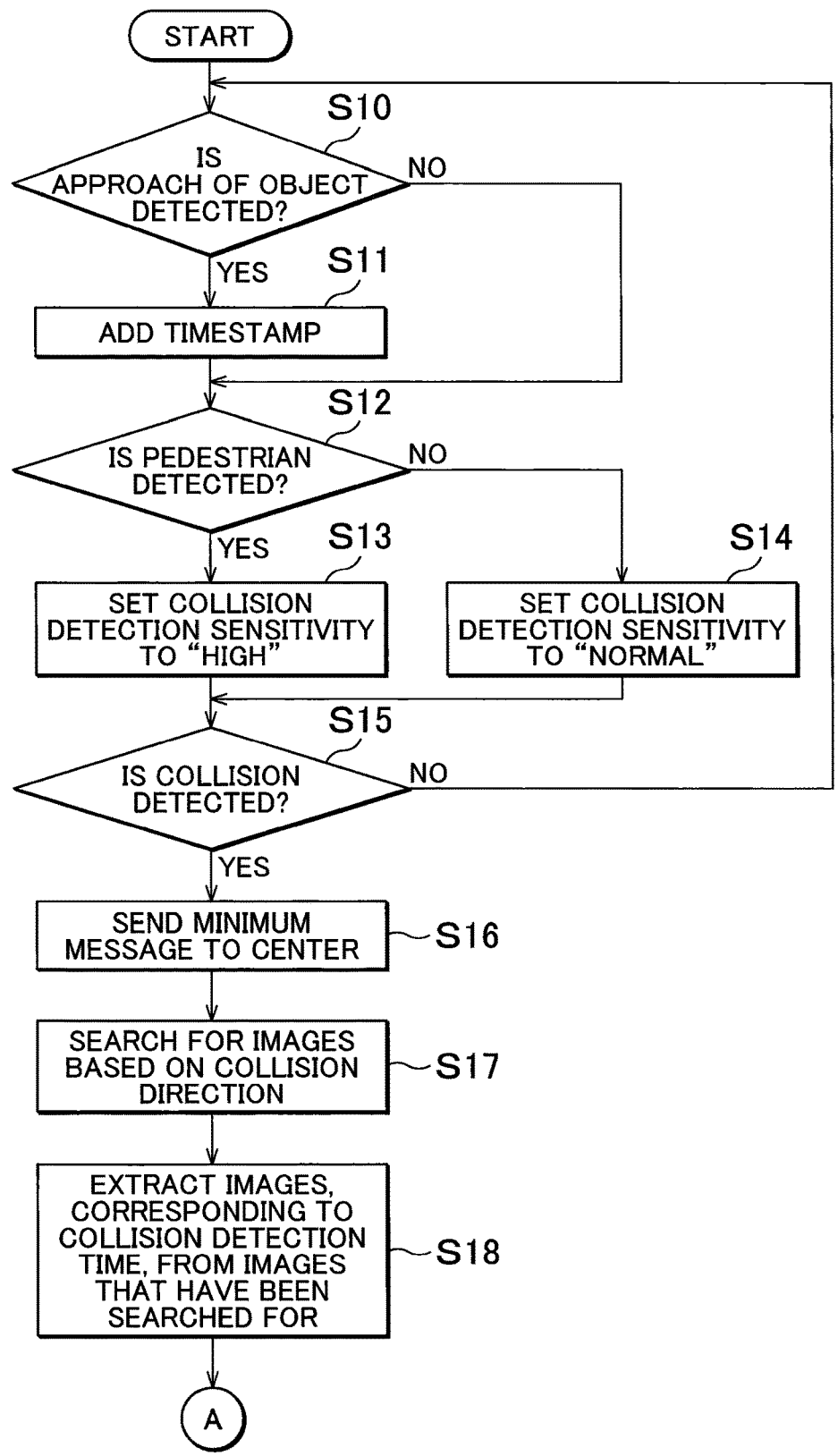
FIG. 3 is a flowchart showing a processing procedure for the notification processing performed by the on-vehicle emergency notification device in the embodiment.
Figure 3B:
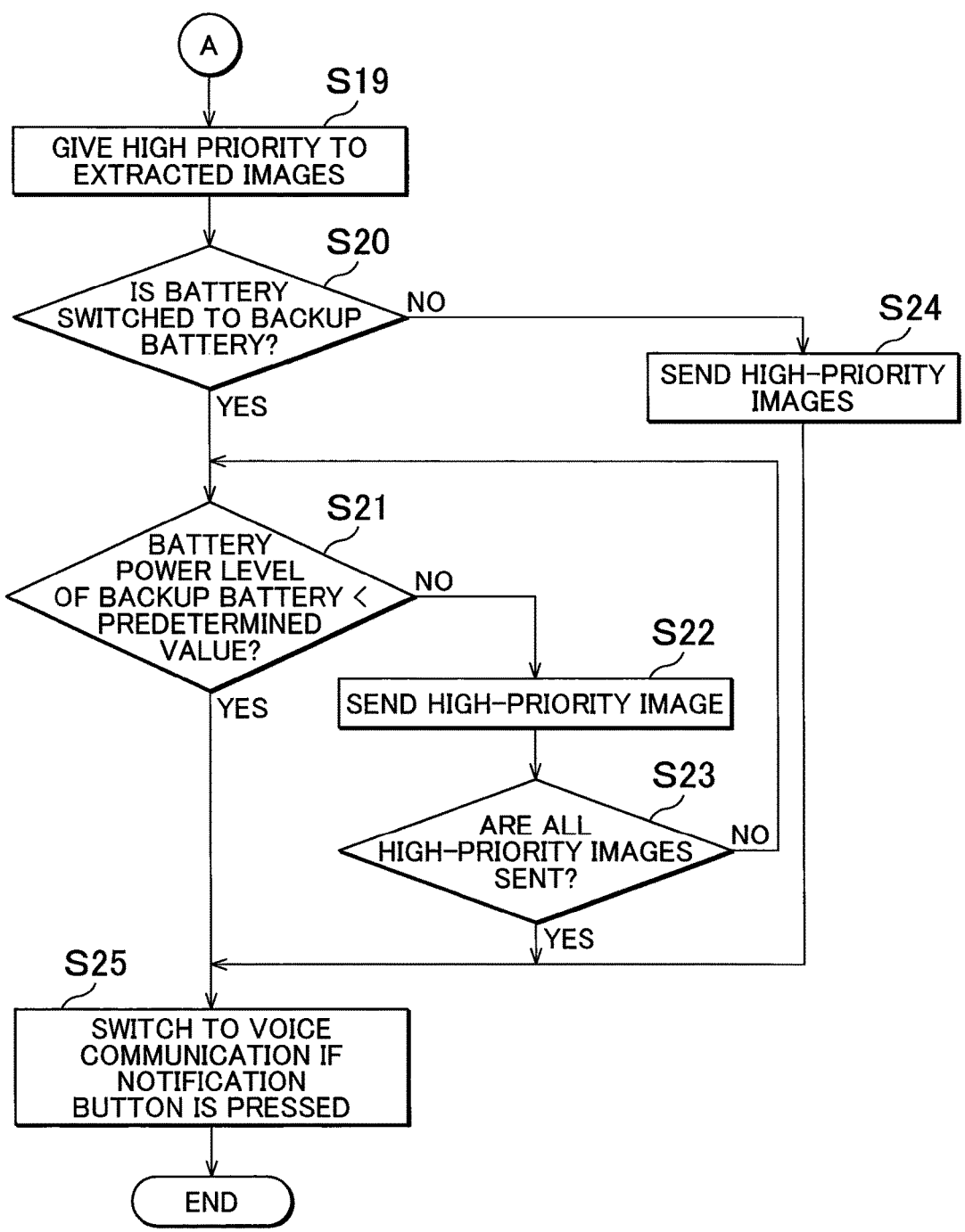

Next, as the operation of the device in this embodiment, the following describes the specific procedure for the processing of notification to the notification center 300 that is performed by the emergency notification device 100 when the vehicle 200 collides. To implement this processing, the emergency notification device 100 performs the processing, shown in FIG. 3, during a travel of the vehicle 200.

First, based on the output result of the approach detection sensor 132, the emergency notification device 100 monitors whether an object around the vehicle approaches (step S10). If the approach of an object is detected (step S10=YES), the emergency notification device 100 adds the timestamp, one type of an electronic signature indicating the recording date and time, to the image recorded in the image recording device 136 at that time (step S11). On the other hand, if the approach of an object is not detected (step S10=NO), the emergency notification device 100 does not add the timestamp to the image recorded in the image recording device 136 at that time.

Next, the emergency notification device 100 monitors whether there is a pedestrian around the vehicle based on the output result of the pedestrian detection sensor 131 (step S12). If a pedestrian is detected (step S12=YES), the emergency notification device 100 sets the collision detection sensitivity higher than usual based on the output result of the collision detection sensor 133 (step S13). More specifically, when the collision detection sensor 133 is an acceleration sensor, the threshold used by the acceleration sensor to determine whether the vehicle 200 collides is set lower than usual to make it easier to detect a collision of the vehicle 200. This is because, when the vehicle 200 collides with a pedestrian, there is a great need for notifying the notification center 300 of the images around the vehicle for obtaining the state of the pedestrian even if the collision load is not so large. On the other hand, if a pedestrian is not detected (step S12=NO), the collision detection sensitivity is set to a normal value based on the output result of the collision detection sensor 133 (step S14).

Next, after setting the collision detection sensitivity based on the output result of the collision detection sensor 133, the emergency notification device 100 determines whether a collision of the vehicle 200 is detected based on the output result of the collision detection sensor 133 (step S15). If a collision of the vehicle 200 is not detected (step S15=NO), the processing is returned to step S10 to repeat the processing in step S10 to step S15 until a collision of the vehicle 200 is detected.

On the other hand, if a collision of the vehicle 200 is detected (step S15=YES), the emergency notification device 100 sends the minimum message that is the highly important information in the processing of notification from the vehicle 200 to the notification center 300 (step S16). The minimum message includes such information as the vehicle ID and the position information on the collision occurrence position of the vehicle 200.

Next, the emergency notification device 100 detects the collision direction of the vehicle 200 and, at the same time, searches the images, accumulated in the image recording device 136, for images that are relatively necessary to be sent to the notification center 300, based on the detected collision direction (step S17). More specifically, the emergency notification device 100 detects the collision direction of the vehicle 200 based on the amount of change in the acceleration in the forward/backward and right/left directions of the vehicle at the collision time of the vehicle 200. When it is detected that the vehicle had a front collision, the emergency notification device 100 searches the images, accumulated in the image recording device 136, for images, which are output from the front camera that monitors the area in front of the vehicle 200, as images highly necessary to be sent to the notification center 300. That is, if the collision detection content of the vehicle 200 includes the information on the collision direction of the vehicle 200, the emergency notification device 100 searches for images corresponding to the detected collision direction as images highly necessary to be sent to the notification center 300.

Next, based on the time at which the collision of the vehicle 200 was detected, the emergency notification device 100 extracts images, which are particular necessary to be sent to the notification center 300, from the images searched for in step S17 (step S18).

Figure 4A:
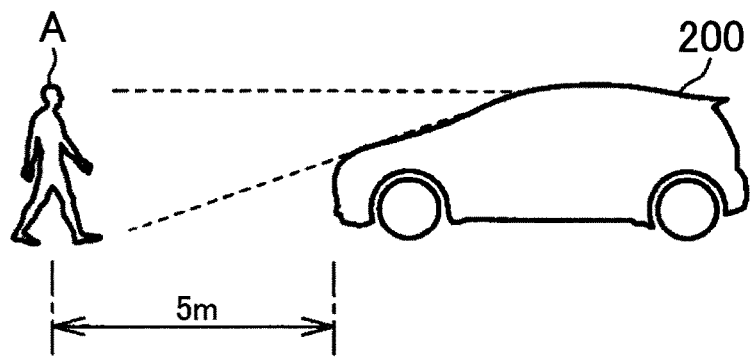
FIG. 4A is a side view schematically showing the positional relation between a vehicle and a pedestrian when an example of an image to which a high priority is given is captured.

More specifically, as shown in FIG. 4A, the emergency notification device 100 extracts images, which are included in the images searched for in step S17 and which were captured a predetermined length of time (a length of time required for traveling 5 m in the example shown in FIG. 4A) before the time the vehicle 200 collided with the pedestrian A, as the images particularly necessary to be sent to the notification center 300. That is, if the collision detection content of the vehicle 200 includes a collision time of the vehicle 200, the emergency notification device 100 extracts the images corresponding to the detected collision time as images particularly necessary to be sent to the notification center 300.

Figure 4B:
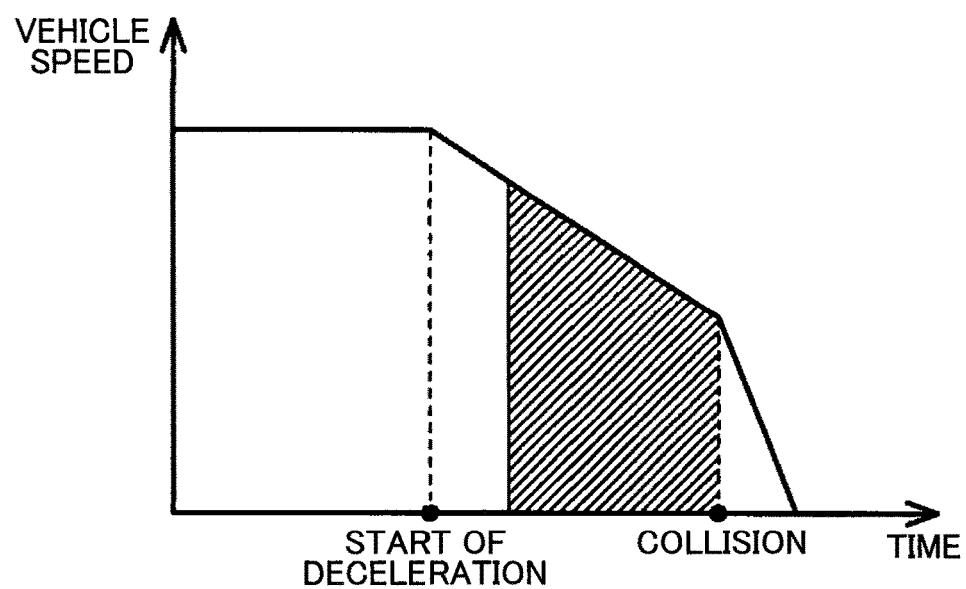
FIG. 4B is a graph showing a change in vehicle speed over time until a vehicle collision is detected.

In this case, as shown in FIG. 4B, the change in vehicle speed over time is integrated with respect to the time axis in the reverse direction in time from the time the vehicle 200 collided with the pedestrian A. The resulting integration value (area of the part indicated by shading in FIG. 4B) indicates the travel distance of the vehicle 200 to the collision point of the vehicle 200. After that, a predetermined number of images before and after the time on the time axis, at which the travel distance of the vehicle 200 reaches the predetermined distance, are extracted as the images that are particularly necessary to be sent to the notification center 300. The emergency notification device 100 compares the imaging time of an image, to which the timestamp was added in step S11, with the time at which the collision of the vehicle 200 was detected to ensure the reliability of the imaging time of an image to be used in comparison. The emergency notification device 100 gives a high priority to the extracted images so that these images are preferentially sent to the notification center 300 (step S19).

Next, the emergency notification device 100 determines whether the power supply is switched from the on-vehicle battery 120 to the backup battery 112 (step S20). If the power supply of the emergency notification device 100 is switched to the backup battery 112 (step S20=YES), the emergency notification device 100 determines whether the battery power level of the backup battery 112 is lower than the predetermined value (step S21). This predetermined value is set in advance as a value corresponding to the battery capacity of the backup battery 112 that is necessary for transferring voice calls between the emergency notification device 100 and the notification center 300 via the Internet line L for a predetermined time (for example, 11 minutes).

After that, if the battery power level of the backup battery 112 is equal to or higher than the predetermined value (step S21=NO), the emergency notification device 100 sends a unit number of images (for example, one image), to which a high priority is given in step S19, to the notification center 300 using the power accumulated in the backup battery 112 (step S22). Next, the emergency notification device 100 determines whether all images, to which a high priority is given in step S19, are sent (step S23). If a part of the images to which a high priority is given are not yet sent (step S23=NO), the emergency notification device 100 returns the processing to step S21 to repeat the processing in steps S21 to step S23 until the battery power level of the backup battery 112 becomes lower than the predetermined value or until all highly prioritized images are sent. That is, the emergency notification device 100 determines whether the battery power level of the backup battery 112 is lower than the predetermined value each time an image is sent and, unless the battery power level is lower than this value, sequentially and continuously sends highly prioritized images.

On the other hand, if the battery power level of the backup battery 112 is lower than the predetermined value (step S21=YES), the emergency notification device 100 inhibits the sending of images and allows a voice call to be started through the notification button 116 (step S25).

Even after all highly prioritized images are sent (step S23=YES), the emergency notification device 100 allows a voice call to be started through the operation of the notification button 116 as long as the battery capacity of the backup battery 112 is sufficient. This is because all necessary images have already been sent to the notification center 300 (step S25).

If the power supply of the emergency notification device 100 is not yet switched to the backup battery 112 (step S20=NO), the on-vehicle battery 120 can still supply a sufficient power. In this case, the emergency notification device 100 sends the images, to which a high priority is given in step S19, to the notification center 300 using the power accumulated in the on-vehicle battery 120 (step S24). If the notification button 116 is pressed while images are sent, the emergency notification device 100 allows a voice call to be started as described above (step S25).

In this embodiment, the images captured a predetermined time before the collision of the vehicle 200, that is, the images captured a predetermined distance before the collision occurrence position of the vehicle 200, are extracted from the images accumulated in the image recording device 136 and are preferentially sent to the notification center 300. Therefore, the images that capture the state before the collision of the vehicle 200 are sent preferentially to the notification center 300 as the images that are likely to include the information useful for verifying the cause of the collision of the vehicle 200.

Figure 5:
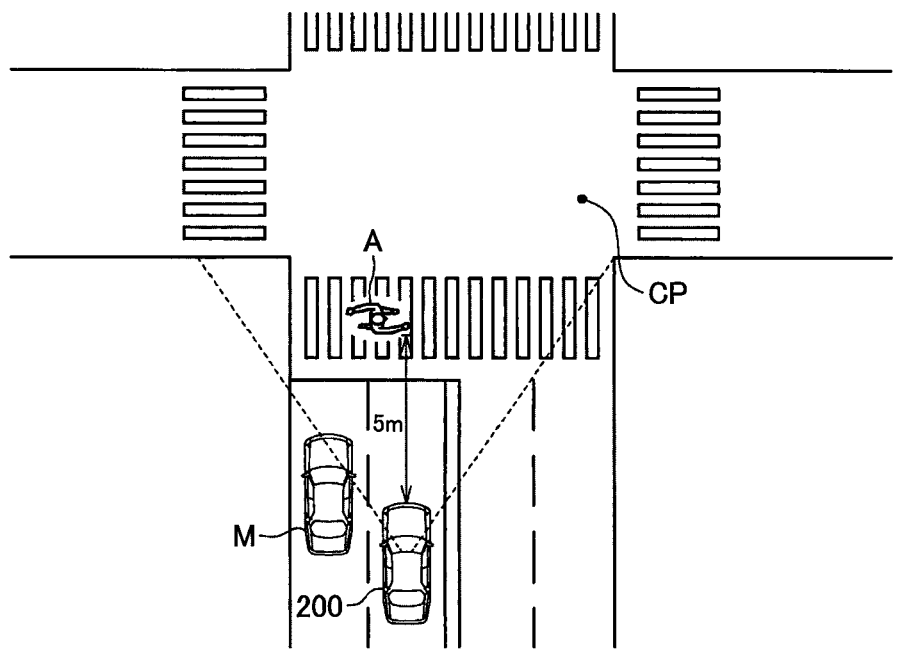
FIG. 5 is a top view schematically showing an example of a situation in which a vehicle collision occurs.

As an example of such an image, FIG. 5 shows an image captured when the vehicle 200, which is going to enter the intersection CP, collides with the pedestrian A who is hidden by another vehicle M that has been waiting at the intersection CP. In this example, the image captured at the position a predetermined distance (in this example, 5 m) before the position of collision between the vehicle 200 and the pedestrian A captures the state before the collision of the vehicle 200. This means that there is a high possibility that the information useful for verifying the cause of the collision of the vehicle 200 is included in the captured image. In addition, in this image, the surrounding conditions of the collision position of the vehicle 200, such as the positional relation between the other vehicle M and the pedestrian A, are recorded in a wide range. As in the manner described above, the images that capture the surrounding conditions of the collision position of the vehicle 200 in a wide range are sent to the notification center 300 more preferentially than the image that is captured at the collision position of the vehicle 200. These preferentially sent images are images that are likely to include the information useful for verifying the cause of the collision of the vehicle 200 or the information useful for understanding the overall state of the collision of the vehicle 200.

As described above, the first embodiment gives the following effects.

(1) If the battery power level of the backup battery 112 becomes lower than the predetermined value after the collision of the vehicle 200 is detected based on the output result of the collision detection sensor 133 mounted on the vehicle 200, the wireless sending of images to the notification center 300, which is performed by the wireless communication unit 115, is inhibited. The inhibition of this wireless sending reserves the power supply (battery power level) necessary for voice communication with the notification center 300 via a voice call, making it possible to report the collision occurrence of the vehicle 200 and to exchange the necessary information. On the other hand, if the battery power level of the backup battery 112 is equal to or higher than the predetermined value after the collision of the vehicle 200 is detected, the wireless communication unit 115 is allowed to wirelessly send images to the notification center 300. These images, though not so urgent as the voice communication described above, are information important for verifying the state of the vehicle collision. In this way, a notification can be sent at a vehicle collision time using a notification unit better suited for the battery power level of the backup battery 112.

(2) Because priority is given to the images according to the collision detection content of the vehicle 200, the images that are likely to identify the occurrence state of the collision of the vehicle 200 more in detail are preferentially sent wirelessly. Therefore, the occurrence state of the collision of the vehicle 200 can be notified to the notification center 300 quickly and accurately.

(3) The images captured a predetermined time before the collision occurrence of the vehicle 200, more in detail, the images captured immediately before the collision occurrence of the vehicle 200, are preferentially sent to the notification center 300 wirelessly. Therefore, the information useful for verifying the cause of the collision occurrence of the vehicle 200 is preferentially notified to the notification center 300.

(4) The images captured a predetermined distance before the collision occurrence position of the vehicle 200, more in detail, the images captured immediately before the collision occurrence of the vehicle 200, are preferentially sent to the notification center 300 wirelessly. Therefore, the information useful for verifying the cause of the collision occurrence of the vehicle 200 is preferentially sent to the notification center 300. In addition, the images that capture the surrounding conditions of the collision position of the vehicle 200 in a wide range are wirelessly sent to the notification center 300 more preferentially than the images captured at the collision position of the vehicle 200. Therefore, the information useful for generally understanding the state of the collision occurrence of the vehicle 200 is notified preferentially to the notification center 300.

(5) The images that include an object to which an impact force is applied by the collision of the vehicle 200, that is, the images that are a minimum requirement for verifying the cause of the emergency event occurrence, are preferentially sent to the notification center 300 wirelessly. Therefore, the state of the collision occurrence of the vehicle 200 can be notified to the notification center 300 while reducing the amount of information (images) that is sent to the notification center 300.

(6) Even if the amount of power, required for wirelessly sending all highly prioritized images, is larger than the amount of power corresponding to the battery power level of the backup battery 112, the images are wirelessly sent to the notification center 300 as long as the battery power level of the backup battery 112 is equal to or larger than the predetermined value. Therefore, the images can be sent wirelessly to the notification center 300 as long as possible while ensuring the battery power level of the backup battery 112 required for voice communication with the notification center 300 via a voice call.

(7) It is possible to determine whether the vehicle 200 has collided, for example, based on the output result of the acceleration sensor that is mounted on the vehicle 200 as the collision detection sensor 133. It is also possible to set the detection sensitivity changeable depending upon the monitoring level at which the output result is determined. Therefore, if the pedestrian A is detected in the images around the vehicle, that is, if there is a high possibility that the pedestrian A is included in the causes of the collision occurrence of the vehicle 200, the collision occurrence of the vehicle 200 may be made more sensitive to allow the occurrence state to be notified to the notification center 300 accurately.

(8) A secondary battery is used as the backup battery 112. Therefore, even if the backup battery 112 is already consumed to a certain degree before the collision of the vehicle 200, the consumed power of the battery can be recovered by recharging during the travel of the vehicle 200 before the collision occurrence of the vehicle 200. In addition, a secondary battery, if used for the backup battery 112, can reduce the required battery capacity as compared to a primary battery because a secondary battery can be recharged. This realizes a compact design of the backup battery 112, leading to a reduction in the installation space of the backup battery 112 in the vehicle 200.

(Second Embodiment)

Next, a second embodiment of the on-vehicle emergency notification device is described below with reference to the drawings. The second embodiment differs from the first embodiment in that the on-vehicle emergency notification device determines whether all highly prioritized images are to be sent wirelessly to the notification center 300. Therefore, in the description below, emphasis is placed on a configuration that differs from that of the first embodiment and the duplicate description of a configuration similar or equivalent to that in the first embodiment is omitted.

Figure 6A:
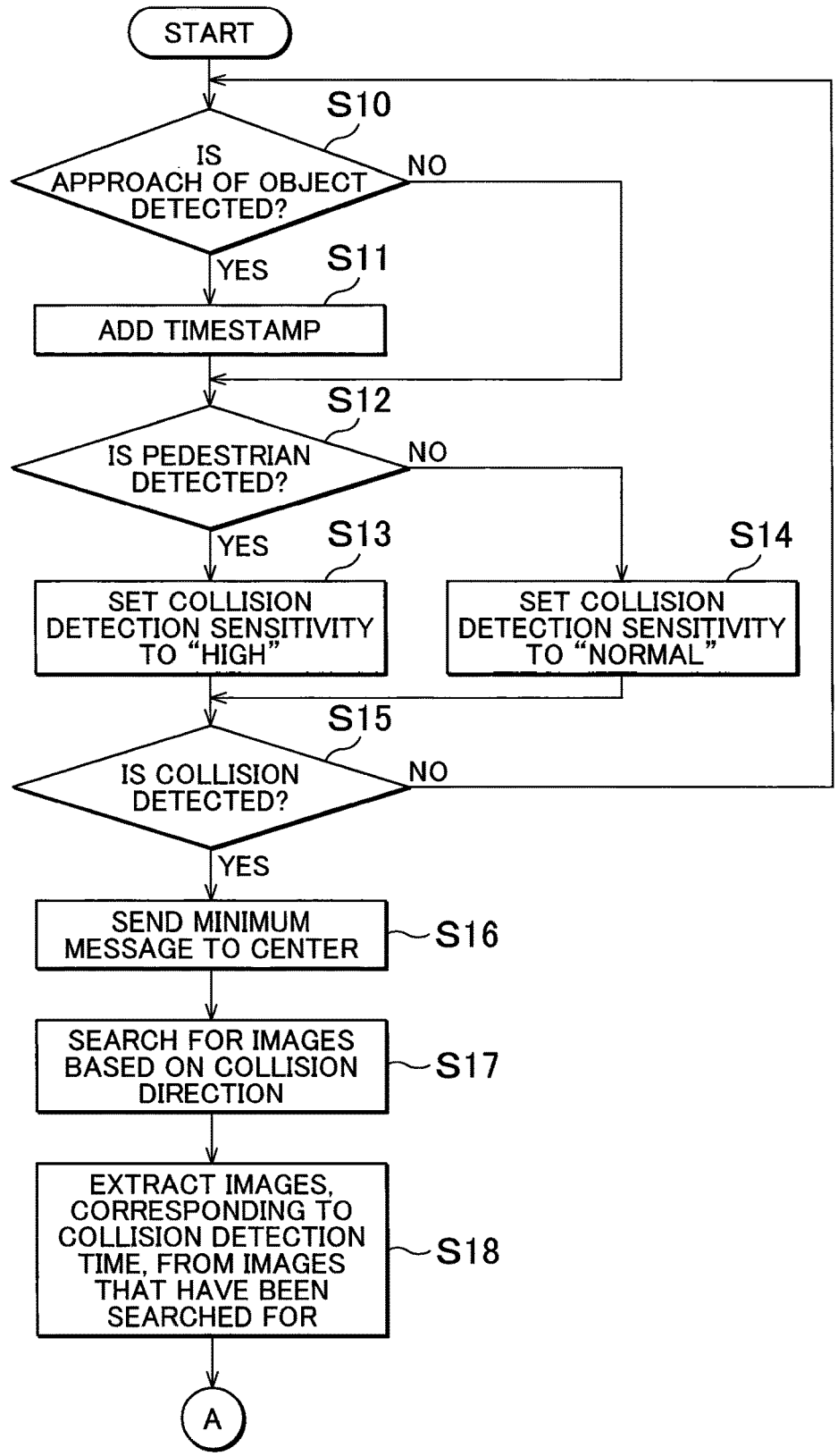
FIG. 6 is a flowchart showing a processing procedure for the notification processing performed by an on-vehicle emergency notification device in a second embodiment.
Figure 6B:
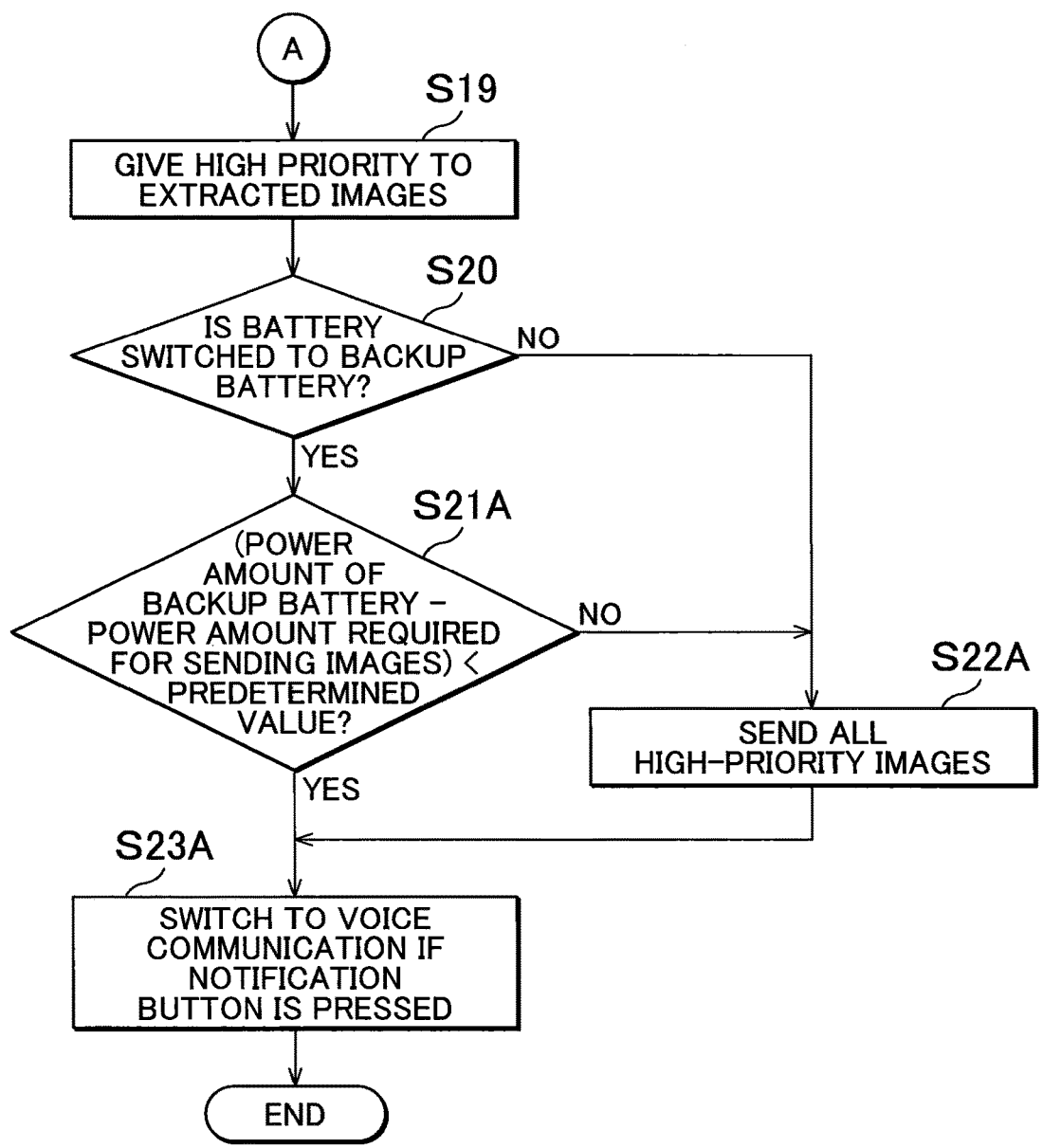

As shown in FIG. 6, if the power supply is switched to the backup battery 112 (step S20=YES), the emergency notification device 100 estimates the power of the backup battery 112 that will remain after sending all highly prioritized images. This estimation value of the battery power level is calculated by subtracting the amount of power required for sending all highly prioritized images to the notification center 300 from the current amount of power accumulated in the backup battery 112. As described above, the highly prioritized images refer to a predetermined number of fixed-resolution images captured before and after the time on the time axis at which the travel distance of the vehicle has reached a predetermined distance. The predetermined number of images is predefined. Therefore, the amount of power required to send all highly prioritized image to the notification center 300 can be estimated.

If the battery power level of the backup battery 112 is equal to or higher than a predetermined value (step S21A=NO), all images to which a high priority is given in step S19 are sent from the emergency notification device 100 to the notification center 300 using the power accumulated in the backup battery 112 (step S22A). In the meanwhile, if the notification button 116 is pressed, the emergency notification device 100 allows a voice call to be started (step S23A).

On the other hand, if the battery power level of the backup battery 112 is lower than the predetermined value (step S21A=YES), the emergency notification device 100 inhibits the sending of highly prioritized images and allows a voice call to be started if the notification button 116 is pressed (step 23A).

In this embodiment, before the images are sent from the emergency notification device 100 to the notification center 300, the emergency notification device 100 determines whether the amount of battery power, which will be supposed to remain in the backup battery 112 after sending all highly prioritized images, is smaller than the predetermined value. If it is determined as a result of this determination that the battery power level of the backup battery 112 is equal to or higher than the predetermined value, all highly prioritized images are sent from the emergency notification device 100 to the notification center 300 at the same time using the power accumulated in the backup battery 112. On the other hand, if it is determined that the battery power level of the backup battery 112 is lower than the predetermined value, the sending of all highly prioritized images from the emergency notification device 100 to the notification center 300 is inhibited.

Therefore, the second embodiment described above achieves the following effect in place of the effect (6) of the first embodiment described above.

(6A) The emergency notification device 100 estimates whether the battery power level of the backup battery 112 after wirelessly sending all highly prioritized images will be lower than the predetermined value. Based on this estimation result, the emergency notification device 100 determines whether the highly prioritized images are to be sent to the notification center 300. Therefore, the battery power level of the backup battery 112, which will be necessary for voice communication with the notification center 300 via a voice call, can be reserved more reliably.

The above embodiments may also be performed in the following mode.

In the above embodiments, a primary battery may also be used as the backup battery 112. In addition, the backup battery 112 may be used as a battery only for the emergency notification device 100. In this configuration, the power of the backup battery 112 may be consumed by self-discharge before the vehicle 200 collides.

In the above embodiments, the emergency notification device 100 need not necessarily include the backup battery 112, which is used as an emergency battery, if a notification is sent to the notification center 300 at a collision occurrence time of the vehicle 200 using the power accumulated in the on-vehicle battery 120. In such a configuration, if the battery power level of the on-vehicle battery 120 becomes lower than a predetermined value, it is desirable to inhibit the wireless communication unit 115 from wirelessly sending images to the notification center 300.

In the above embodiments, the emergency notification device 100 may perform the notification processing, whether at a travel time or at a parking time of the vehicle 200, if the electric system is active (on). In this case, it is desirable that a plurality of images, captured by the on-vehicle cameras 135 at a predetermined interval, be stored if the electric system is active (on) whether at a travel time or at a parking time of the vehicle 200. In such a configuration, if the travelling position of the vehicle 200 immediately before a collision does not almost change, for example, if the vehicle 200 collides with another vehicle during a stop, it is desirable that the images, captured a predetermined time before the collision occurrence time of the vehicle 200, be sent to the notification center 300.

In the above embodiments, the position information that indicates the capturing position of an image, in association with the position information output from the GPS 134A of the navigation device 134, may be added to that image recorded in the image recording device 136. In such a configuration, too, it is desirable that the images captured a predetermined distance before the collision occurrence position of the vehicle 200 be sent to the notification center 300 when the vehicle 200 collides, based on the position information added to the images.

In the above embodiments, the images captured at the collision occurrence time of the vehicle 200 and the images captured after the collision of the vehicle 200 may be set as highly prioritized images.

In the above embodiments, the images captured after the collision of the vehicle 200 may be sent sequentially from the emergency notification device 100 to the notification center 300. In this case, priority is not given to the images accumulated in the image recording device 136.

In the above embodiments, in acquiring the travel distance, the travel distance of the vehicle to the collision position of the vehicle may be calculated by integrating the travel time of the vehicle to the collision detection time of the vehicle with respect to the vehicle's speed at the collision detection time of the vehicle 200. Alternatively, the travel distance of the vehicle to the collision position of the vehicle may be calculated by integrating the travel time of the vehicle to the collision detection time of the vehicle with respect to the vehicle's speed before the vehicle decelerates.

In the above embodiments, as the on-vehicle cameras that capture the area around the vehicle or as the image recording device in which the images captured by the on-vehicle cameras are stored, the emergency notification device 100 may include devices connected, not via the vehicle network NW, but directly thereto.

In the above embodiments, images may be sent wirelessly from the vehicle 200 to the notification center 300 over any communication line such as a dedicated wireless line.

In the above embodiments, an example is described in which a predetermined number of images recorded before and after the time on the time axis, at which the travel distance of the vehicle 200 has reached a predetermined distance, are extracted as the images particularly necessary to be sent to the notification center 300. That is, the images recorded "a predetermined time" before the collision occurrence time of the vehicle 200 include not only the images recorded at the time on the time axis at which the travel distance of the vehicle 200 has reached the predetermined distance but also the images recorded at the times before and after that time. Instead of this, one image recorded at a time on the time axis at which the travel distance of the vehicle 200 has reached the predetermined distance may be extracted as an image particularly necessary to be sent to the notification center 300. That is, the images recorded "a predetermined time" before the collision occurrence time of the vehicle 200 may be an image recorded at a time on the time axis at which the travel distance of the vehicle 200 has reached the predetermined distance.

In the above embodiments, an example is described in which the collision of the vehicle 200 is detected if the deceleration of the vehicle 200 is equal to or larger than the threshold. In this case, the collision of the vehicle 200 is detected even if the collision of the vehicle 200 can be avoided by applying heavy braking but if the deceleration of the vehicle 200 is equal to or larger than the threshold. That is, the occurrence of an "emergency event" includes not only a case in which the vehicle 200 collides but also a case in which the vehicle 200 almost collides. Instead of this, the collision may be detected only in a case in which the vehicle 200 actually collides. That is, the occurrence of an "emergency event" may refer only to the collision of the vehicle 200.

What is claimed is:

1. An on-vehicle emergency notification device that performs notification processing when an emergency event of a vehicle occurs, using a power accumulated in a battery mounted on the vehicle, the device comprising:
    a voice communication unit configured to perform voice communication with a notification center via a voice call at the timing the emergency event occurs; and
    an image sending unit configured to wirelessly send automatically images around the vehicle to the notification center at the timing the emergency event occurs, wherein
    after the emergency event occurs, a wireless sending of images by the image sending unit is inhibited when a battery power level of the battery becomes lower than a predetermined value required for performing the voice communication with the notification center via the voice call, and the image sending unit preferentially sends images captured immediately before the emergency event for verifying cause of the emergency event.

2. The on-vehicle emergency notification device according to claim 1 wherein when the emergency event occurs, the image sending unit gives priority to images around the vehicle according to content of the emergency event and preferentially sends highly prioritized images wirelessly.

3. The on-vehicle emergency notification device according to claim 2 wherein the image sending unit gives a high priority to images captured a predetermined time before a time when the emergency event occurred.

4. The on-vehicle emergency notification device according to claim 2 wherein the image sending unit gives a high priority to images captured a predetermined distance before a position where the emergency event occurred.

5. The on-vehicle emergency notification device according to claim 2 wherein the image sending unit gives a high priority to images captured in a direction of an impact force when the emergency event occurred.

6. The on-vehicle emergency notification device according to claim 1 wherein the battery power level of the battery is determined each time an image is wirelessly sent via the image sending unit.

7. The on-vehicle emergency notification device according to claim 1 wherein the battery power level of the battery is determined by a remaining amount of battery power calculated by subtracting an amount of power required for sending the images to be wirelessly sent from an amount of power accumulated in the battery.

8. The on-vehicle emergency notification device according to claim 1 wherein occurrence detection sensitivity to the emergency event is increased when a pedestrian is detected as an images around the vehicle.

9. The on-vehicle emergency notification device according to claim 1 wherein the battery is a backup battery that is an emergency battery and the backup battery is a secondary battery.

* * * * *